United States Patent [19]

Campbell et al.

[11] 4,253,389
[45] Mar. 3, 1981

[54] BREAKAWAY RESET MECHANISM

[75] Inventors: Willis R. Campbell, Ephrata; Randy Greaser, New Holland; James T. Clevenger, Jr., Lancaster, all of Pa.

[73] Assignee: Sperry Corporation, New Holland, Pa.

[21] Appl. No.: 118,832

[22] Filed: Feb. 5, 1980

[51] Int. Cl.³ .............................................. B65B 13/18
[52] U.S. Cl. ...................................................... 100/5
[58] Field of Search ................................ 100/5, 13, 88

[56] References Cited

U.S. PATENT DOCUMENTS

| 3,859,909 | 1/1975 | Mast | 100/88 |
| 4,072,095 | 2/1978 | Campbell | 100/5 |
| 4,158,331 | 6/1979 | Campbell | 100/5 |
| 4,167,844 | 9/1979 | Freimuth | 100/5 |

Primary Examiner—Billy J. Wilhite
Attorney, Agent, or Firm—Frank A. Seemar; Larry W. Miller; James R. Bell

[57] ABSTRACT

In a twine wrapping apparatus for a crop roll forming machine effective to bind the periphery of a crop roll with a binding material having at least a first binding material dispenser and a second binding material dispenser, drive apparatus connected to the binding material dispensers and overload protective apparatus positionable between a driving connection and a non-driving connection between the drive apparatus and the binding material dispensers, there is provided an alignment apparatus cooperable with the drive apparatus and the overload protective apparatus to retain the drive apparatus so that it is held in a fixed position while the overload protective apparatus is moved from the non-driving connection to the driving connection to thereby permit the binding material dispensers to be driven through their predetermined paths of travel.

25 Claims, 7 Drawing Figures

BREAKAWAY RESET MECHANISM

BACKGROUND OF THE INVENTION

This invention relates to the twine wrapping mechanism commonly found in crop roll forming machines and, more particularly, to apparatus which will permit the overload protective device which protects the twine dispensers from damage to be easily reset in the driving position when the twine dispensers are subjected to a torque loading that exceeds a predetermined level.

Historically, it has been the custom to harvest forage crops by mowing the particular crop, letting it dry in the field, forming the dried crop material into windrows and passing a hay-baling machine over and along these windrows to form the crop material into rectangular bales. Recent practice has shown that the formation of crop material into large compact rolls, rather than rectangular bales as formerly done, permits the crop material to be deposited in roll form and left in fields for extended periods of time. The ability to leave these rolled bales in fields obviates the additional steps required in the traditional rectangular baling process of gathering the bales and transporting them to a storage area protected from the elements. This new technique of forming large round bales has created a baling system that can be conducted by one person. This is in marked contrast to the traditional practice of forming rectangular bales where the labor of several people was required to effect the cutting, drying, windrowing, baling, gathering and storing of the crop material.

Several methods of forming compact cylindrical rolls of crop material have evolved through the years. The most successful of these methods involves the forming of crop rolls by picking up a swath or windrow of material from the field and directing it onto a lower conveyor. This conveyor transports the material to a bale forming region where an upper apron or flight of belts, usually positioned above and adjacent the conveyor, moves in a suitable direction to rotate the crop material with which it is brought into contact. The increasing popularity of these crop roll forming machines has seen their use broaden from rolling wintering forage for livestock to rolling high protein crops, such as alfalfa, for dairy livestock. Therefore, these machines are the focal point of many ideas for developing both labor-saving and time-saving apparatus.

One of the areas to which attention has been directed is the area of wrapping the completed crop roll or bale with twine. Methods or techniques of applying twine to a completed crop roll have developed from a manually powered system through various electrical and hydraulically powered systems to finally an automatic twine wrapping system, which is mechanically driven without any operator input once the bale reaches a predetermined size. An example of this type of apparatus is found in U.S. Pat. No. 4,167,844 to Freimuth et al, dated Sept. 18, 1979. As shown and explained in this patent, there is achieved the saving of individual labor via the use of the automatically activated twine wrapping apparatus and the saving of time by the use of multiple twine dispensing tubes which move in a generally arcuate path across the periphery of the crop roll.

The development of this type of an automatic twine wrapping apparatus, as well as any of the other powered twine wrapping apparatus, such as electric motor or hydraulically driven variations, has required the use of some type of an overload protective device to prevent excessive damage from occurring to the twine wrapping apparatus under certain conditions. During operation occasionally rocks, broken portions of fencing and other large unyieldable obstacles are fed by the pickup into the roll forming area of the crop roll forming machine. When this infeed of ingestion occurs during the twine wrapping cycle, it is quite common for the twine dispensing tubes, which normally rotate about a fixed axis, to make contact with the obstruction. If the twine wrapping apparatus did not have some type of a breakway or overload protective device, severe damage would occur to the apparatus itself, as well as to the drive system for the twine wrapping apparatus.

One variation of a breakaway or overload protective apparatus that has been employed successfully is that shown in U.S. Pat. No. 4,072,095 to Campbell et al, issued Feb. 7, 1978. This type of breakaway device disengages the dispensing tubes or twine dispensers from the drive system above a previously calculated torque load before damage can occur to either the dispensers or the drives.

Once the overload protective device or breakaway has interrupted the transmission of power from the driving means to the twine dispensing tubes, the twine wrapping apparatus is inoperative until the breakaway is reset to the power transmitting position. In the type of apparatus shown and described in U.S. Pat. No. 4,167,844, this resetting of the apparatus into the power transmitting condition or position can be extremely difficult since the two dispensing tubes must be moved simultaneously while the connecting links in the drives and retained in suitable positions to permit the breakaway to be reset. This is a burdensome operation for one person and usually requires more than one person to accomplish. The disadvantage of this type of a design is obvious when it is realized that crop roll forming machines are designed to be and essentially function as one person hay or crop gathering systems. More frequently than not, an extra individual is not readily available to assist in resetting the twine wrapping apparatus.

The foregoing problems are solved in the design of the machine comprising the present invention by providing alignment means in a twine wrapping apparatus to permit the overload protective apparatus or breakaway to be repositioned in the power transmitting position by retaining at least a portion of the drives in a fixed position in a manner that is easily accomplished by a single individual.

SUMMARY OF THE INVENTION

It is an object of the present invention to provide an improved twine wrapping apparatus in a crop roll forming machine that will permit the dispensing tubes to be easily movable so that the overload protective device is reset to a power transmitting position with a minimal amount of effort on the part of the single individual.

It is a feature of the present invention to provide an alignment means for the drive system linkage to hold a portion of the linkage fixedly in position until the breakaway or overload protective device is reset to the drive or power transmitting position.

It is a feature of this invention that the breakaway or overload protective device is reset to the power transmitting position by manually moving the twine dispensing tubes to a predetermined position sufficient to reengage or reset the breakaway.

It is an advantage of the present invention that one person can easily reset the breakaway without any additional help.

It is another advantage of this invention that the alignment means is relatively simple and low cost.

These and other objects and advantages are obtained by providing in a crop roll forming machine a twine wrapping apparatus effective to bind the periphery of a crop roll with a binding material having at least a first binding material dispenser and a second binding material dispenser drive apparatus connected to the binding material dispensers and the overload protective apparatus positionable in a driving connection and a non-driving connection between the drive apparatus and the binding material dispensers, and an alignment apparatus cooperable with the drive apparatus and the overload protective apparatus to retain the drive apparatus so that it is held in a fixed position while the overload protective apparatus is moved from the non-driving connection to the driving connection to thereby permit the binding material dispensers to be driven through their predetermined paths of travel.

BRIEF DESCRIPTION OF THE DRAWINGS

The advantages of this invention will become apparent upon consideration of the following detailed disclosure of the invention, especially when it is taken in conjunction with the drawings, wherein:

FIG. 4 is a partially diagrammatic illustration of the operation of the twine dispensers when the overload protective device or breakaway is in the power transmitting or driving connection position;

FIG. 5 is a partially diagrammatic illustration which shows the effect on the twine dispensers and the drive linkage of the ingestion of an object into the machine when the predetermined torque loading on the overload protective device is exceeded;

FIG. 6 is a partially diagrammatic illustration of the initial movement of the twine dispensers of the twine wrapping apparatus to reset the overload protective device on a crop roll forming machine showing the non-driving movement of the drive means after the torque loading on the overload protective device has exceeded the predetermined level; and FIG. 7 is a partially diagrammatic view of the twine wrapping apparatus as the twine dispensers are raised to their fully raised position while one link of the drive means is held stationary against the alignment means.

DETAILED DESCRIPTION OF THE PREFERRED EMBODIMENT

Figure 1:
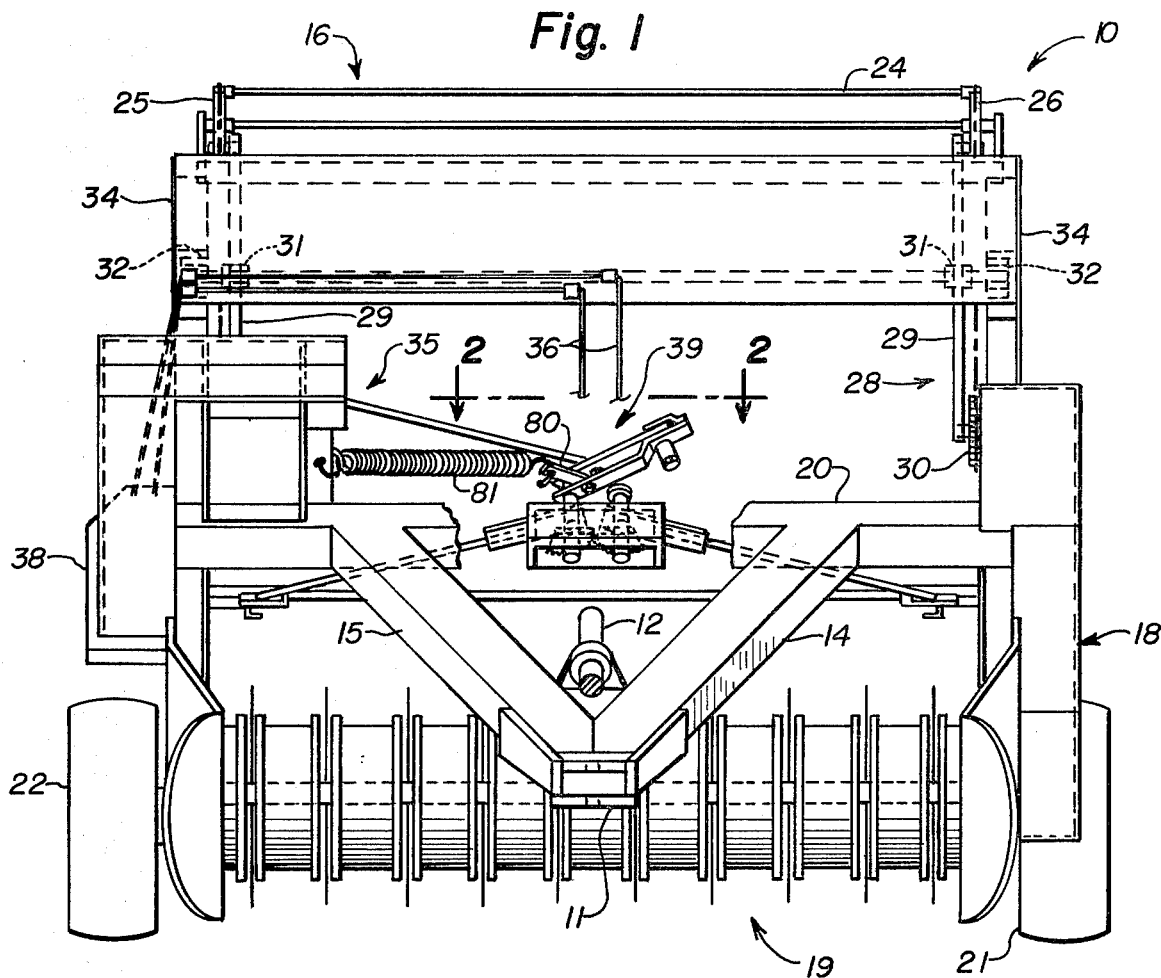
FIG. 1 is a front elevational view of a crop roll forming machine utilizing twine wrapping apparatus with an overload protective device and an alignment means.

Referring generally to the drawings and in particular to FIG. 1, there is shown a frontal view of a crop roll forming machine 10 of the type illustrated in U.S. Pat. No. 3,859,909 to Mast, dated Jan. 14, 1975. The crop roll forming machine 10 is illustrated as being fastenable to a towing vehicle, such as a tractor (not shown), via a hitch 11 and a power takeoff 12. The power takeoff 12 provides the driving force for the mechanically operated components of the crop roll forming machine. The hitch 11 is mounted on the junction of tongue members 14 and 15, so that it is readily connectable to the corresponding hitch of the tractor. The fluid necessary to operate the hydraulic components of the crop roll forming machine 10 passes to the crop roll forming machine through the hydraulic lines (not shown) of the tractor from a hydraulic reservoir in the tractor.

The roll forming machine 10, as shown in FIG. 1, comprises an upper frame, indicated generally by the numeral 16. The lower frame 18 has mounted on its forward portion a pickup 19, normally tined, for collecting crop material deposited in preformed windrows on a field and delivering it to the roll forming machine 10. The lower frame includes a series of beam members, as illustrated in the aforementioned patent to Mast, hereinafter specifically incorporated by reference in pertinent part.

The lower frame 18 has appropriately fastened to it a floor, also not shown, for supporting a crop roll. The floor has parallel spaced apart channels in it with conveying chains running therealong, as illustrated in the aforementioned patent to Mast. Alternately the floor may consist of one conveyor belt rotatably mounted or any other means suitable for supporting crop material once it is delivered thereto by the pickup 19. The lower frame 18 is mobilely mounted to a pair of wheels 21 and 22 via a suitable axle and support beam.

Upper bale forming means 24 travels about the periphery of the roll forming machine 10 on a series of appropriately mounted idler sprockets, such as sprockets 25 and 26, and a drive sprocket (not shown). A bale forming means takeup mechanism is indicated generally by the numeral 28 and includes a pair of pivotable parallel arms 29, one being positioned at each side of the frame. The arms 29 have an idler sprocket 30, only one of which is shown, mounted thereto. The takeup mechanism 28 pivots about a pair of bearings 31 and 32 mounted in the side walls 34 of the upper frame 16 and functions to permit the required length of bale forming means 24 to be played out about an expanding crop roll as it is formed in the machine.

An automatic twine wrapping mechanism of the type disclosed in U.S. Pat. No. 4,167,844, hereinafter specifically incorporated by reference in pertinent part, is indicated generally by the numeral 35 and is fastened to the horizontal beam 20 and the upper frame 16 generally. The twine wrapper 35 is fed strings of twine 36 from a twine box 38 mounted to one of the side walls 34 of the upper frame 16. The twine 36 is placed about the completed crop roll by a center pivot dispensing apparatus indicated generally by the numeral 39. This apparatus 39 is shown and described in detail in U.S. Pat. No. 4,158,331 to Campbell et al, issued June 19, 1979. This apparatus 39 is shown in further detail in FIGS. 2 and 3.

Figure 2:
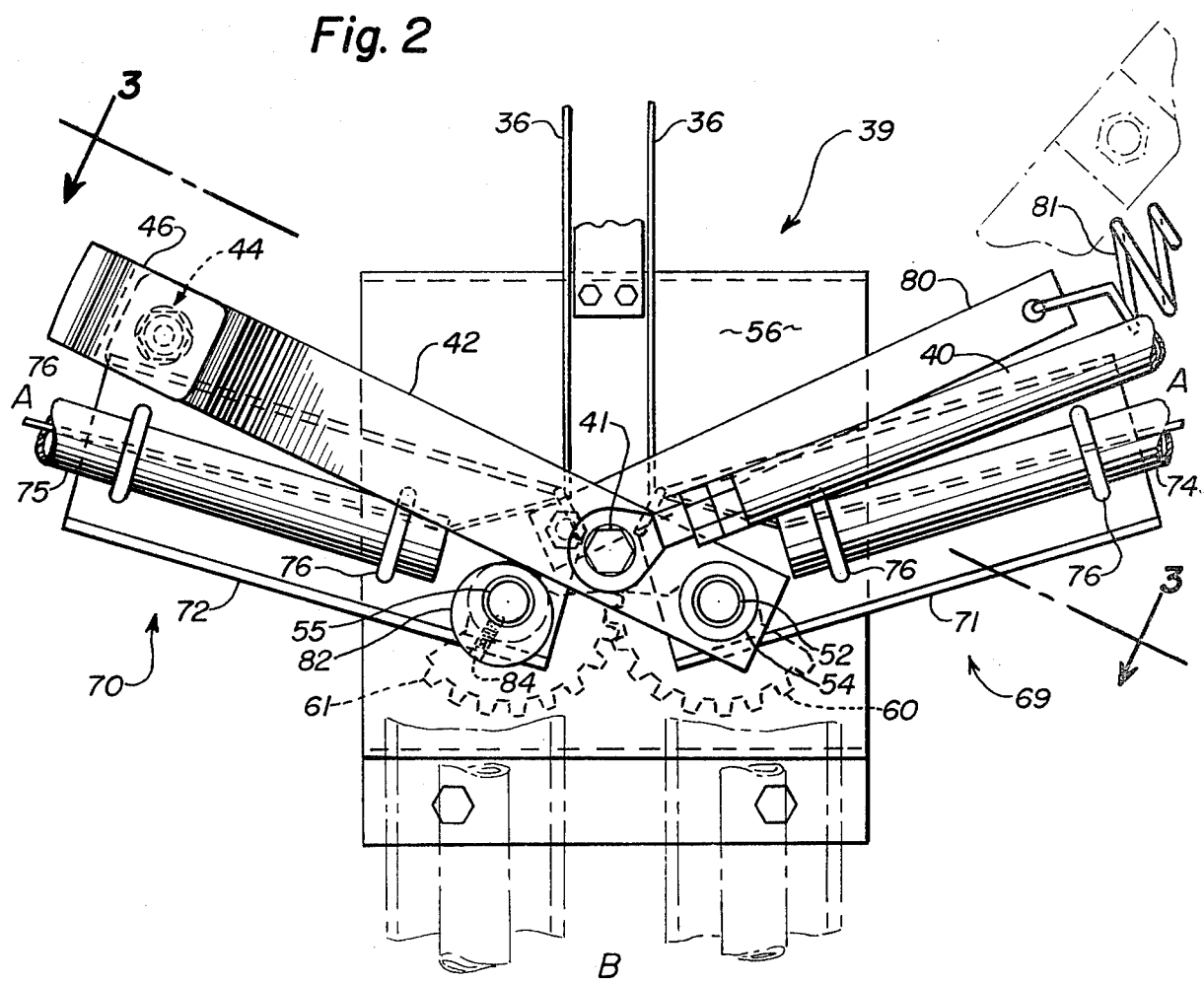
FIG. 2 is a partially sectional view taken along the section lines 2—2 of FIG. 1.
Figure 3:
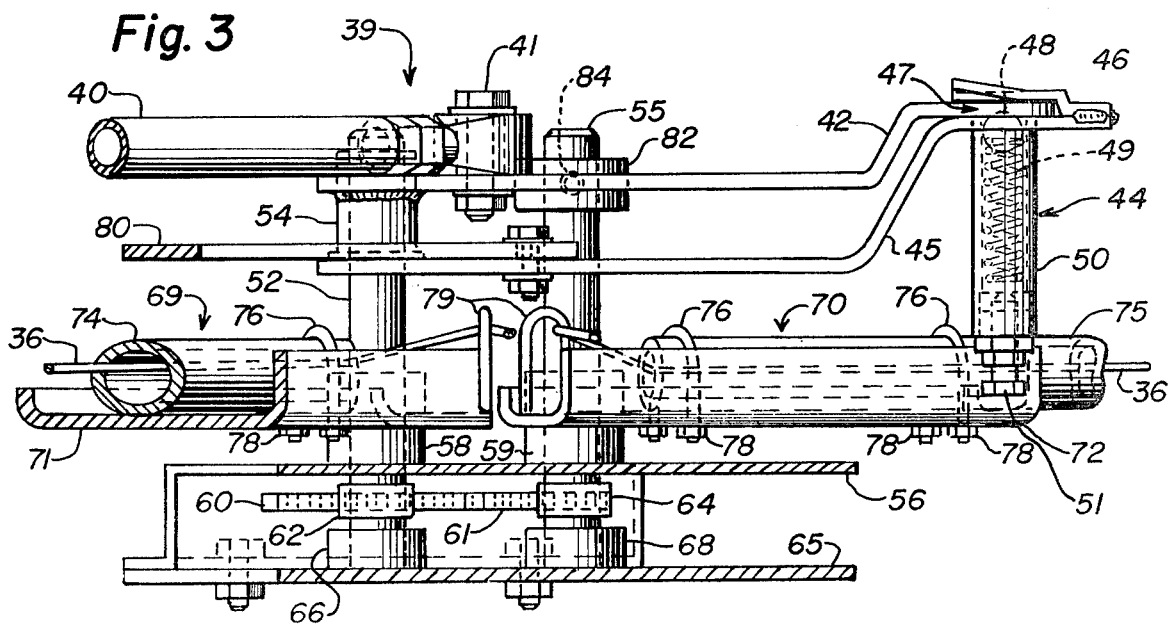
FIG. 3 is an elevational view of the twine wrapping apparatus with its breakaway taken along the section lines 3—3 of FIG. 2.

Looking specifically at FIGS. 2 and 3, there is shown a drive arm 40 which is fastened by means of a retaining bolt, nut and washer 41 to a first driven link 42. The opposing end of drive arm 40 is connected to an appropriate power source. Driven link 42 is fastened via a breakaway or overload protective device, indicated generally by the numeral 44, to a second driven link 45. The end of link 42 is seated within an appropriately sized and shaped slot 47 formed by a retaining member 46 and link 45. Retaining member 46 is appropriately fastened, such as by welding, to the end portion of driven link 45. Link 42 is held in place against the lower portion of retaining member 46 by the pressure of the engaging ball 48 and breakaway 44. Ball 48 is spring biased at a predetermined loading pressure by compression spring 49, which is contained within an elongate generally hollow, internally threaded tube 50. The ball 48 is forced into engagement by spring 49 with link 42 at a desired compression setting that is selected by turning an adjustment bolt 51 which is threaded into elongate tube 50. Driven link 45 has an appropriately sized orifice (not shown) to permit engaging ball 48 to pass therethrough into contact with link 42 when the breakaway 44 is in the power transmitting or driving connection. In the same area the tube 50 is appropriately inset in and rigidly fastened to the link 45. This permits link 42 to be held between the slot 47 and the retaining member 46 within the predetermined torque loading level, above which the breakaway mechanism or overload protective device 44 will react when it is activated, allowing the link 42 to be forced out of the slot 47. This permits the link 42 to freely rotate back and forth in response to the driving movement of drive arm 40.

Driven link 42 rotates about a stub shaft 52, which has appropriately fastened thereabout a journal 54, seen in FIGS. 2 and 3. A second stub shaft 55 is generally parallel to stub shaft 52 and offset therefrom. Both stub shafts pass through a metal covering sheet 56. Retaining collars 58 and 59 are fastened about shafts, 52 and 55, respectively, just above covering sheet 56, best seen in FIG. 3. A pair of intermeshing involute spur gears 60 and 61 are mounted about the stub shafts 52 and 55, respectively, via appropriate collars 62 and 64. Shafts 52 and 55 are fastened to plate 65 via journals 66 and 68. Plate 65 is appropriately fastened, such as by welding or bolts, to horizontal beam 20.

Collars 58 and 59 also have the twine dispensers 69 and 70, respectively, fastened thereto. The dispensers consist of shaped plates 71 and 72 which are fixedly fastened to collars 58 and 59, respectively, and rotate therewith. Plates 71 and 72 have elongate hollow tubes 74 and 75, respectively, appropriately fastened thereto, such as by the U-shaped brackets 76 and nuts 78. Guide brackets 79, most clearly shown in FIG. 3, are fastened to shaped plates 71, 72 and serve to direct the strings of twine 36 into the tubes 74 and 75.

Driven link 45, also most clearly shown in FIG. 3, has a drag link 80 appropriately movably attached thereto, such as by a nut, bolt and washers. Drag link 80 is spring biased by spring 81, see briefly FIG. 1, which is suitably fastened to the housing of the automatic twine wrapper 35. Spring 81 serves to bias the driven link 45 so that when activated the twine dispensers 69 and 70 move from the raised position indicated by the letter A in FIG. 2 to the fully down position shown in phantom and indicated by the letter B.

Shaft 55 extends sufficiently far in length beyond covering sheet 56 to permit a collar 82 to be mounted thereabout. Collar 82 is adjustable, being held in position by set screw 84, best seen in FIGS. 2 and 3. The length of stub shaft 55 is sufficient to permit the collar 82 to be positioned so that it is in the plane of rotation of link 42. It should be noted that collar 82 is shown as being eccentric in design. This permits it to be turned, by loosening the set screw 84, to the appropriate position to ensure that link 42 is engaged at the proper time to permit the breakaway to be reset to the driving position. The preferred eccentric design of collar 82 permits any variation in manufacturing tolerances to be corrected easily, although it would be possible to use a uniformly thick collar or even simply shaft 55 as the interfering surface that engages and retains link 42 during the resetting operation.

In operation, the crop roll forming machine 10 is pulled along and across a windrow of crop material in a field by a towing vehicle, such as a tractor. The pickup 19 gathers the crop material from the windrow and directs it into the roll forming region of the roll forming machine 10 where a crop roll is formed. When the roll has reached the desired size, the twine wrapping apparatus 35 is activated to apply the twine about the periphery of the crop roll while it is rotated in the roll forming region by the movement of the upper bale forming means 24 and the particular floor conveyor means. Twine dispensers 69 and 70 are driven through their predetermined paths of travel by the drive arm 40, as seen in FIG. 4. Dispensers 69 and 70 move from a generally raised position indicated by the letter A to the generally fully down position indicated by the letter B and then are returned to the raised position A. Twine is dispensed across the periphery of the crop roll during the travel of the dispensers 69 and 70 during only the B to A portion of their path of travel. Should an obstruction be positioned along the predetermined path of travel, as depicted in FIG. 5, such that one of the dispensers 69 or 70 strikes the obstruction with sufficient force to transmit a torque resistance greater than the predetermined torque load setting on the breakaway, the breakaway or overload protective device 44 of FIG. 3 reacts. Link 42 rides off engaging ball 48 and is freely driven without transferring any power from drive arm 40 to driven link 45. Driven link 45 remains in its spring biased position and the dispensers 69 and 70 fall to and remain in their lowered position.

Once the obstruction is removed by the operator of the crop roll forming machine, the overload protective device must be reset. This is accomplished by gripping the dispenser 69 and raising it from the fully lowered position B to the fully raised position A. This causes the other dispenser 70, through the spur gears 62 and 64, to also move from the fully lowered position B to the fully raised position A. This movement of the dispensers causes the links 42 and 45 to rotate in a counterclockwise direction, as seen in FIG. 6. In order to assure that link 42 is retained in its proper position and does not rotate out of alignment with the slot 47 created by driven link 45 and retaining member 46, see briefly FIG. 3, stub shaft 55 with its collar 82 interferes with link 42's rotational movement. Link 42 is thus held in place until link 45 has been sufficiently rotated in a counterclockwise direction to force the link 42 into the slot 47, overriding the compressive spring force of spring 49 and locking it into position with engaging ball 48. This is best seen in FIG. 7. Thus reset, the dispensing apparatus 39 is again ready for operation.

It should be noted that although the invention is discussed in the context of being utilized with an automatic twine wrapping apparatus, it could easily be well utilized with any type of a twine wrapping apparatus that utilizes single or multiple twine dispensers, whether powered such as by a hydraulic cylinder or an electric motor.

While the preferred structure in which the principles of the present invention have been incorporated is shown and described above, it is to be understood that the invention is not to be limited to the particular details thus presented but, in fact, widely different means may be employed in the practice of the broader aspects of this invention. The scope of the appended claims is intended to encompass all obvious changes in the details, materials and arrangements of parts that will occur to one of ordinary skill in the art upon a reading of this disclosure.

Having thus described the invention, what is claimed is:

1. In a twine wrapping apparatus for a crop roll forming machine effective to bind the periphery of a crop roll with a binding material, comprising:
   (a) at least a first binding material dispenser and a second binding material dispenser, the first dispenser being rotatable about a first axis through a first predetermined path of travel and the second dispenser being rotatable about a second axis through a second predetermined path of travel;
   (b) drive means connectable to the first and second binding material dispensers effective to selectively drive the dispensers through the predetermined paths of travel;
   (c) overload protective means positionable between a driving connection and a non-driving connection between the drive means and the first and second binding material dispensers effective upon being subjected to loading beyond a predetermined level to break the driving connection; and
   (d) alignment means cooperable with the drive means and the overload protective means to retain the drive means such that the drive means is held in a fixed position while the overload protective means is moved from the non-driving connection to the driving connection to permit the binding material dispensers to be driven through the predetermined paths of travel.

2. The apparatus according to claim 1 wherein the drive means further comprises a driving arm having a first end and an opposing second end, the first end being connectable to a power source and the opposing second end being connectable to a first driven link and a second driven link, the first and second driven links further being connected to the binding material dispensers and cooperable with the overload protective means such that when the loading exceeds the predetermined level the driving connection between the first and second driven links and the binding material dispensers is broken so that the first driven link is drivingly disconnected from the second driven link.

3. The apparatus according to claim 2 wherein the first binding material dispenser rotates about a first shaft mounted along the first axis and the second binding material dispenser rotates about a second shaft mounted along the second axis.

4. The apparatus according to claim 2 wherein the alignment means further comprises an alignment pin extending generally parallel to the first and second axes.

5. The apparatus according to claim 3 wherein the alignment means further comprises an alignment collar generally coaxially positioned with the first axis about the first shaft.

6. The apparatus according to claim 5 wherein the alignment collar is eccentrically shaped and adjustably mounted about the first shaft.

7. The apparatus according to claims 3 or 6 wherein the drive menas further comprises a pair of intermeshing gear means, one of the pair of the gear means being mounted for rotation about the first shaft and the other gear means being mounted from the second shaft effective to transfer the driving power from the driving arm via the driven links to the first and second binding material dispensers.

8. The apparatus according to claim 7 wherein the overload protective device further comprises a compression spring adjustable to predetermined torque loading settings and an engaging ball within an elongate tube, the ball being cooperable with the spring to engage the first link in the driving connection and transmit the driving power below the predetermined loading level and effective to disengage from the first link causing the first link to disengage from the second link in the non-driving connection above the predetermined loading level.

9. In a twine wrapping apparatus having at least a first wrapping material dispenser and a second wrapping material dispenser, driving means connectable to a power source and the wrapping material dispensers, overload protective means cooperative with the driving means and the wrapping means dispensers operable above a predetermined torque loading to assume a non-driving position with respect to the driving means and below the predetermined torque loading to assume a driving position with respect to the driving means to thereby control the transmission of power from the power source to the wrapping dispensers, the improvement comprising:
   alignment means cooperable with the driving means and the wrapping material dispensers to retain at least a portion of the driving means in a fixed position while the overload protective means is moved from the non-driving position to the driving position to permit the transmission of power from the driving source to the wrapping material dispensers.

10. The apparatus according to claim 9 wherein the driving means comprises a driving arm connectable on a first end to the power source and on an opposing second end to a first driven link and a second driven link.

11. The apparatus according to claim 10 wherein the first driven link has a first end and an opposing second end, the first end being connected via the overload protective means to the second driven link and the opposing second end being connected to the second wrapping material dispenser.

12. The apparatus according to claim 11 wherein the second driven link has a first end and an opposing second end, the first end being connected to the overload protective means and having a receptacle suitable for seating the first end of the first driven link in operational communication with the overload protective means in the driving condition.

13. The apparatus according to claim 12 wherein the power from the driving arm is transmitted from the driving arm via the first driven link, the overload protective means and the second driven link to the second wrapping material dispenser.

14. The apparatus according to claim 13 wherein the first wrapping material dispenser is mounted to a first rotatable shaft and the second wrapping material dispenser is mounted to a second rotatable shaft.

15. The apparatus according to claim 14 wherein the power from the second wrapping material dispenser is transmitted to the first wrapping material dispenser via a pair of intermeshing gear means, the first of said pair of gear means being mounted on the first rotatable shaft and the second of said pair of gear means being mounted on the second rotatable shaft.

16. The apparatus according to claim 15 wherein the alignment means further comprises a collar mounted about the first rotatable shaft in interfering rotational relationship with the first link when the overload protective means is moved from the non-driving position to the driving position.

17. In a crop roll forming machine comprising:
(a) a mobile frame;
(b) an upper bale forming means rotatably mounted to the frame;
(c) conveying means mounted to the frame for supporting crop material and moving it into contact with the upper bale forming means;
(d) a roll forming region defined generally by the upper bale forming means and the conveying means where the crop material is formed into a crop roll;
(e) bale wrapping means fastening to the frame for wrapping the crop roll about the periphery with a wrapping material;
(f) drive means fastened to the frame and operatively connected to the bale wrapping means to drive the wrapping means during the wrapping of a crop roll;
(g) overload protective means operatively connected to the bale wrapping means and the drive means effective to transmit the power from the drive means to the bale wrapping means when subjected to loading below a predetermined level and effective to not transmit power from the drive means to the bale wrapping means when subjected to loading above a predetermined level; and
(h) alignment means cooperable with the drive means and the wrapping material dispensers to retain at least a portion of the drive means in a fixed position while the overload protective means is moved from a non-transmitting power condition to a transmitting power condition to permit bale wrapping to be recommenced.

18. The apparatus according to claim 17 wherein the bale wrapping means further comprises a first rotatable dispensing member and a second rotatable dispensing member.

19. The apparatus according to claim 18 wherein the drive means comprises a driving arm connectable on a first end to the power source and on an opposing second end to a first driven link and a second driven link.

20. The apparatus according to claim 19 wherein the first driven link has a first end and an opposing second end, the first end being connected via the overload protective means to the second driven link and the opposing second end being connecting to the second rotatable dispensing member.

21. The apparatus according to claim 20 wherein the second driven link has a first end and an opposing second end, the first end being connected to the overload protective means and in operational communication with the first end of the first driven link and the overload protective means.

22. The apparatus according to claim 21 wherein the power from the driving arm is transmitted from the driving arm via the first driven link, the overload protective means and the second driven link to the second rotatable dispensing member.

23. The apparatus according to claim 22 wherein the first rotatable dispensing member is mounted to a first rotatable shaft and the second rotatable dispensing member is mounted to a second rotatable shaft.

24. The apparatus according to claim 23 wherein the power from the second rotatable dispensing member is transmitted to the first rotatable dispensing member via a pair of intermeshing gear means, the first of said pair of gear means being mounted on the first rotatable shaft and the second of said pair of gear means being mounted on the second rotatable shaft.

25. The apparatus according to claim 24 wherein the alignment means further comprises a collar mounted about the first rotatable shaft in interfering relationship with the first link so that the first link is prevented from moving while the overload protective means is moved from the non-transmitting power condition to the transmitting power condition.

* * * * *